(12) United States Patent
Su

(10) Patent No.: US 7,791,913 B1
(45) Date of Patent: Sep. 7, 2010

(54) SECONDARY SIDE SWITCH-OFF TIMING ADJUSTING METHOD, APPARATUS, AND SYSTEM USING SAME

(75) Inventor: Wei-Chuan Su, Taipei (TW)

(73) Assignee: Grenergy Opto, Inc., Hsin-Chu (TW)

( * ) Notice: Subject to any disclaimer, the term of this patent is extended or adjusted under 35 U.S.C. 154(b) by 0 days.

(21) Appl. No.: 12/466,479

(22) Filed: May 15, 2009

(51) Int. Cl.
*H02M 5/42* (2006.01)
*H02M 3/335* (2006.01)

(52) U.S. Cl. ................................ 363/84; 363/21.12
(58) Field of Classification Search .............. 363/21.06, 363/21.12, 21.13, 21.14, 89, 127
See application file for complete search history.

(56) References Cited

U.S. PATENT DOCUMENTS

| | | | | |
|---|---|---|---|---|
| 5,946,207 A | * | 8/1999 | Schoofs | 363/127 |
| 6,418,039 B2 | * | 7/2002 | Lentini et al. | 363/21.06 |
| 7,161,813 B2 | * | 1/2007 | Librizzi et al. | 363/21.06 |
| 7,636,249 B2 | * | 12/2009 | Hu | 363/127 |

* cited by examiner

*Primary Examiner*—Adolf Berhane
*Assistant Examiner*—Emily Pham
(74) *Attorney, Agent, or Firm*—Ming Chow; Sinorica, LLC (57) ABSTRACT

The present invention discloses a secondary side switch-off timing adjusting method for a switching power conversion, comprising: detecting the falling edge of the voltage across a secondary side transistor according to a first reference voltage to generate a first reset signal; detecting the rising edge of the voltage across the secondary side transistor according to a second reference voltage to generate a first set signal; generating a secondary side discharging end signal from a latch operation in response to the first reset signal and the first set signal; and generating an off-predicting signal according to the cycle period of the secondary side discharging end signal. The present invention also provides a secondary side switch-off timing adjusting apparatus, and a system using the apparatus for a power conversion.

10 Claims, 10 Drawing Sheets

Replacement Sheet (PRIOR ART)
FIG. 3

SECONDARY SIDE SWITCH-OFF TIMING ADJUSTING METHOD, APPARATUS, AND SYSTEM USING SAME

BACKGROUND OF THE INVENTION

1. Field of the Invention

The present invention relates to switching power conversions, and more particularly to switching power conversions capable of adjusting switch-off timing of the secondary side current path of a main transformer.

2. Description of the Related Art

In supplying the power for electronic equipments, switching power converters are widely adopted due to the advantages of high conversion efficiency and small component size they possess.

Figure 1A:
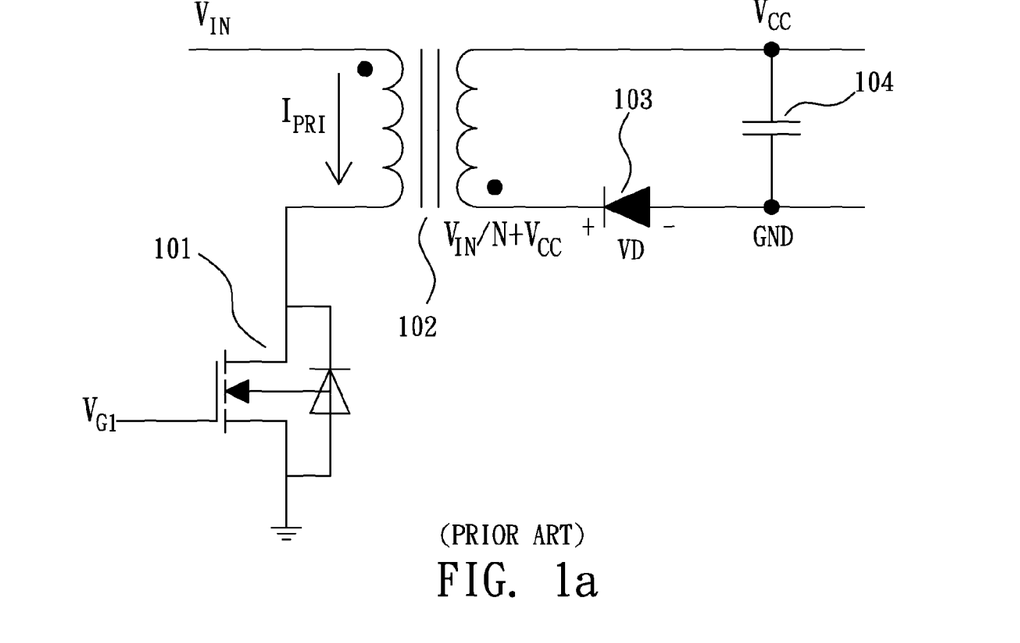
FIG. 1a is an illustrating diagram of a fly-back AC-to-DC power adapter in the charging period of a transformer.
Figure 1B:
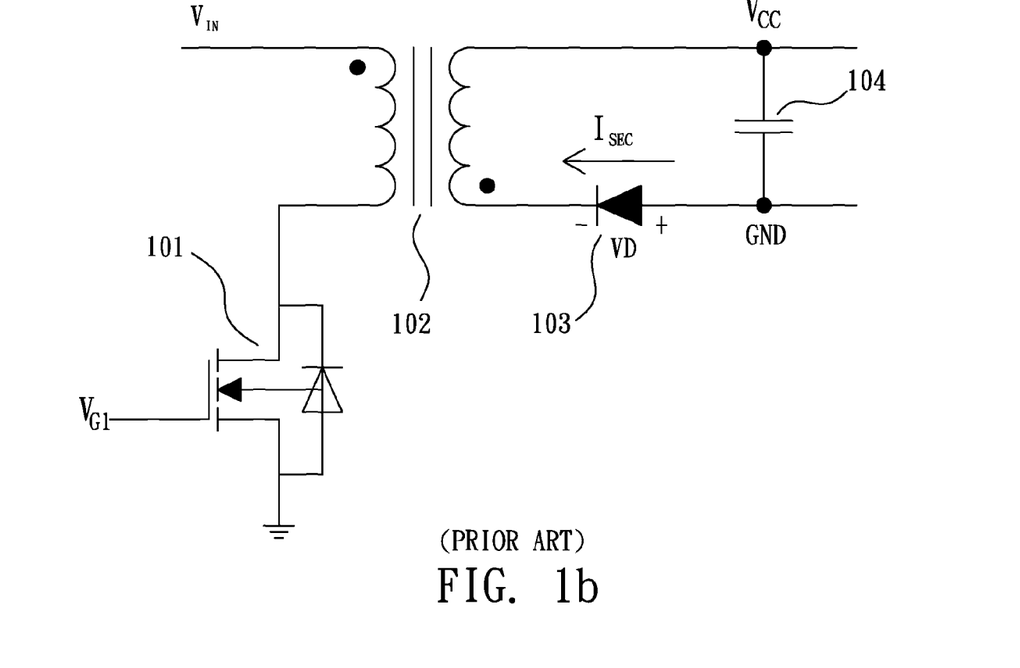
FIG. 1b is an illustrating diagram of a fly-back AC-to-DC power adapter in the discharging period of a transformer.

Taking the fly-back AC-to-DC power adapter as an example, FIG. 1a shows an illustrating diagram of a fly-back AC-to-DC power adapter in the charging period of a transformer and FIG. 1b shows an illustrating diagram of a fly-back AC-to-DC power adapter in the discharging period of a transformer. As shown in FIG. 1a and FIG. 1b, the shown architecture includes an NMOS transistor 101, a main transformer 102, a diode 103 and a capacitor 104.

In the architecture, the NMOS transistor 101 is used to control the power transformation through the main transformer 102 in response to a PWM signal $V_{G1}$.

The main transformer 102 is used to transfer the input DC power $V_{IN}$ to a DC output voltage $V_{CC}$.

The diode 103 is coupled with the secondary side of the main transformer 102 for cutting off the current path at the secondary side when the NMOS transistor 101 is on and releasing the magnetic flux to the capacitor 104 when the NMOS transistor 101 is off. When the NMOS transistor 101 is on, the cathode voltage of the diode 103 is $V_{IN}/N+V_{CC}$, greater than the anode voltage GND of the diode 103, causing the diode 103 reverse biased, so the current path at the secondary side is cut off; when the NMOS transistor 101 is off, the voltage across the secondary side of the main transformer 102 is reversed in polarity, causing the cathode voltage of the diode 103 smaller than the anode voltage of the diode 103, so the current path at the secondary side is turned on.

The capacitor 104 is used for carrying the DC output voltage $V_{CC}$.

Through a periodic on-and-off switching of the NMOS transistor 101, which is driven by the PWM signal $V_{G1}$ generated from a PWM controller (not shown in the figures), the input power is transformed through the main transformer 102 to the output.

However, when the magnetic flux is released through the diode 103, the conduction voltage 0.7V of the diode 103 will consume quite an amount of energy and degrade the conversion efficiency, especially when the DC output voltage $V_{CC}$ is rated at a low voltage.

One solution that conventional power converters utilize to solve this problem is to replace the diode 103 with a switch circuit having a lower conduction voltage to improve the conversion efficiency.

Figure 2:
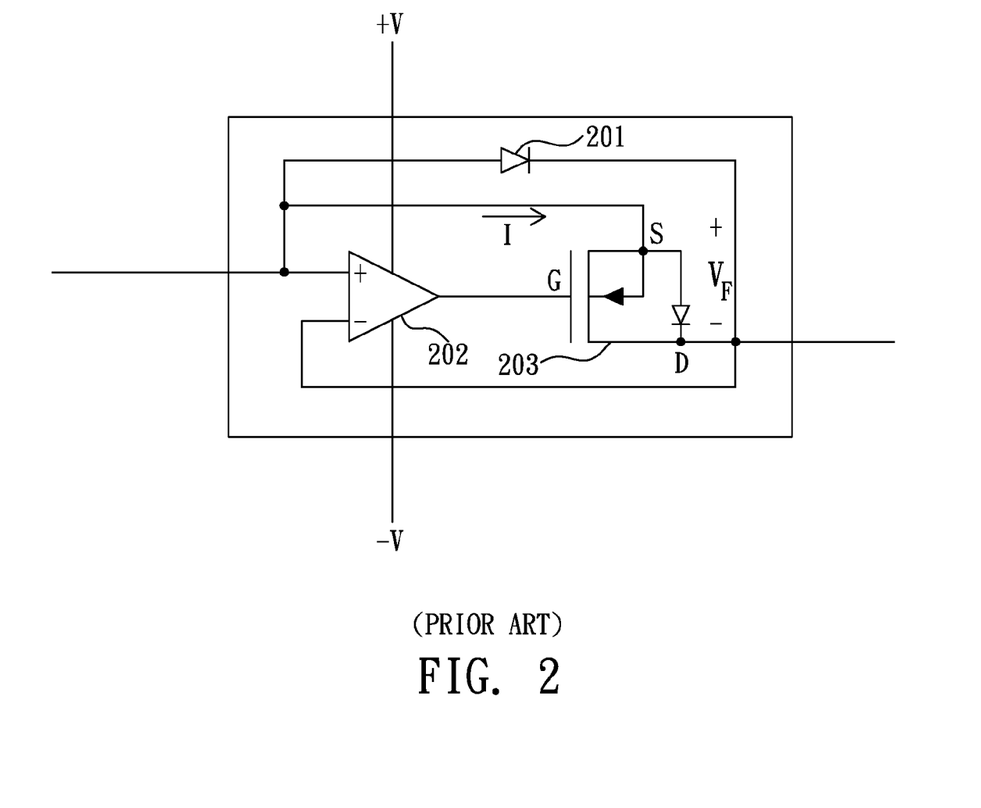
FIG. 2 is a prior art circuit diagram for switching the secondary side of the transformer of a fly-back AC-to-DC power adapter.

Please refer to FIG. 2, which shows a prior art circuit diagram for switching the secondary side of a transformer of a fly-back AC-to-DC power adapter. As shown in FIG. 2, the prior art circuit includes a diode 201, a comparator 202 and an NMOS transistor 203.

The diode 201 is used to handle instances where the switching speed of the comparator 202 and the NMOS transistor 203 is slower than the switching speed of the input signals.

Figure 3:
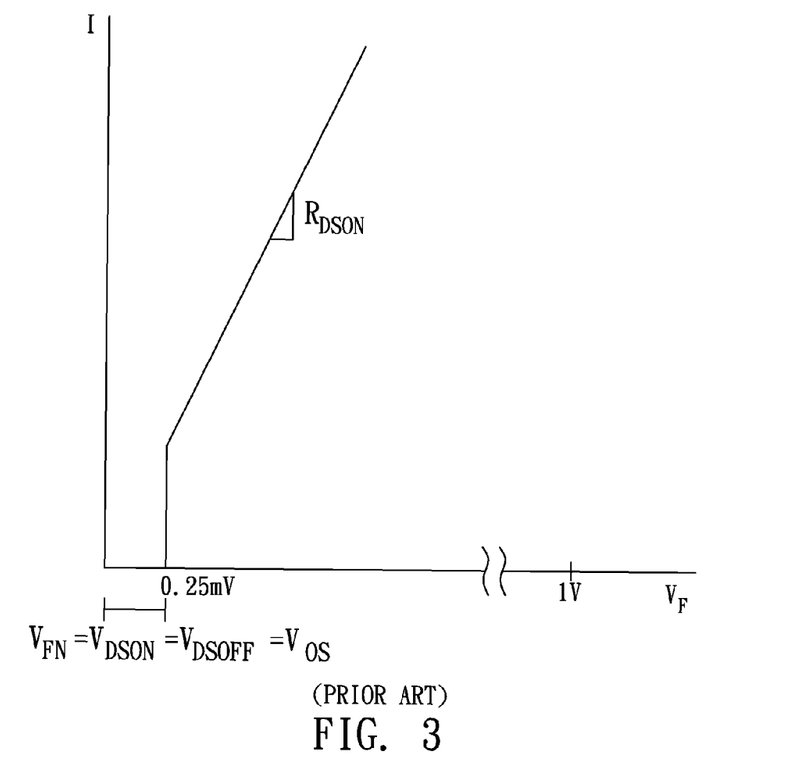
FIG. 3 is the I-$V_F$ diagram according to the prior art circuit in FIG. 2.
Figure 4:
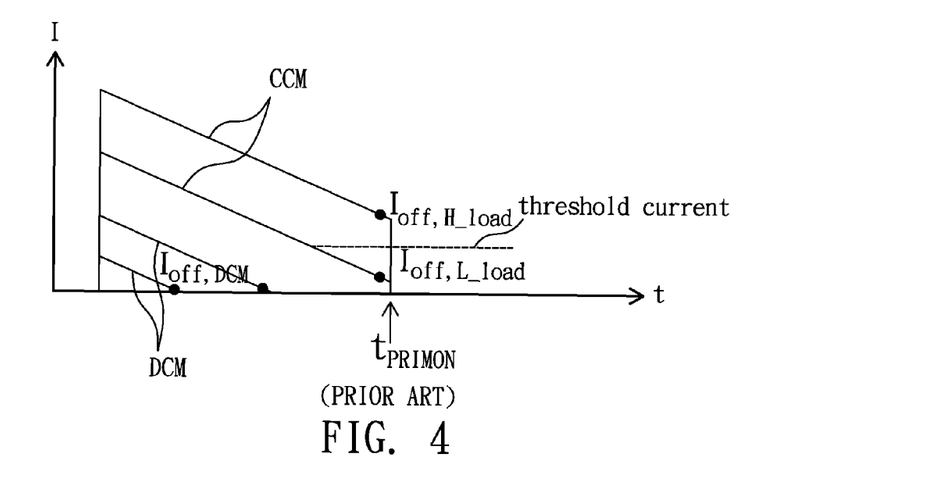
FIG. 4 is the secondary side current v.s. time diagram in the modes of DCM (Discrete Current Mode) and CCM (Continuous Current Mode).

The comparator 202 and the NMOS transistor 203 are used to emulate the function of a diode. The comparator 202 controls the conduction of the NMOS transistor 203 in response to the anode voltage and the cathode voltage of the diode 201. When the anode voltage exceeds the cathode voltage by a threshold voltage, the comparator 202 will turn on the NMOS transistor 203 and the resulting conduction voltage will be much smaller than that of the diode 201, otherwise the comparator 202 will turn off the NMOS transistor 203. The relation between the conduction current I and the conduction voltage $V_F$ of the circuit in FIG. 2 is depicted in FIG. 3. As shown in FIG. 3, when $V_F$ exceeds 0.25 mv, the conduction current I will increase with a slope equal to $1/R_{DSON}$; when $V_F$ falls below 0.25 mv, the conduction current I will reduce to zero. Although this prior art circuit has the advantage of reducing the conduction voltage, there are still two major cons. First, the threshold voltage of 0.25 mv requires a comparator with superior resolution, which is not easy to be implemented. Second, it is difficult to determine the value of the threshold voltage in CCM (Continuous Current Mode). Please refer to FIG. 4, when the power adapter operates in CCM, if the loading condition changes from low load to high load such that the valley current of the high load exceeds a threshold current corresponding to the threshold voltage set previously (threshold voltage=threshold current×$R_{DSON}$), then the switch circuit will never be triggered to cut off the secondary side current path and this may lead to system disaster.

To solve the secondary side current path cut-off problem in CCM, the U.S. Pat. No. 6,771,059B1 proposes to measure the cycle period of the cathode voltage of the secondary side diode by detecting a high voltage $V_{IN}/N+V_{CC}$ (shown in FIG. 1a), an instance corresponding to the conduction of the primary side, and then cut off the secondary side at the time according to the cycle period. However, this scheme can not be applied to the DCM (Discrete Current Mode) case, because, in DCM, the energy in the main transformer has already dried up before the conduction of the primary side, as a result, there will be a reverse current from an output capacitor in the secondary side current path, and the reverse current will interfere with the charging of the main transformer at the conduction of the primary side.

Therefore, there is a need to provide a solution capable of switching off the secondary side current path appropriately both in CCM and DCM.

Seeing this bottleneck, the present invention proposes a novel topology for generating an off-predicting signal capable of appropriately switching off the secondary side current path both in CCM and DCM to prevent reverse current in the secondary side current path.

SUMMARY OF THE INVENTION

One objective of the present invention is to provide a secondary side switch-off timing adjusting method for a switching power converter to appropriately switching off the secondary side current path both in CCM and DCM to prevent reverse current in the secondary side current path.

Another objective of the present invention is to further provide a secondary side switch-off timing adjusting apparatus for a switching power converter to appropriately switching off the secondary side current path both in CCM and DCM to prevent reverse current in the secondary side current path.

Still another objective of the present invention is to further provide a system using a secondary side switch-off timing adjusting apparatus for a switching power converter to appropriately switching off the secondary side current path both in CCM and DCM to prevent reverse current in the secondary side current path.

To achieve the foregoing objectives of the present invention, a secondary side switch-off timing adjusting method for a switching power conversion is proposed, the method comprising the steps of: detecting the falling edge of the voltage across a secondary side transistor according to a first reference voltage to generate a first reset signal; detecting the rising edge of the voltage across the secondary side transistor according to a second reference voltage to generate a first set signal; generating a secondary side discharging end signal from a first latch operation in response to the first reset signal and the first set signal; and generating an off-predicting signal according to the cycle period of the secondary side discharging end signal.

To achieve the foregoing objectives, the present invention further provides a secondary side switch-off timing adjusting apparatus for a switching power conversion, comprising: a first comparator for generating a first reset signal according to voltage comparison of a first reference voltage and the voltage across a secondary side transistor; a second comparator for generating a first set signal according to voltage comparison of a second reference voltage and the voltage across the secondary side transistor; a first latch for generating a secondary side discharging end signal according to the first reset signal and the first set signal; and a turn-off predictor for generating an off-predicting signal according to the cycle period of the secondary side discharging end signal.

To achieve the foregoing objectives, the present invention further provides a system using a secondary side switch-off timing adjusting apparatus for a switching power conversion, comprising: a first comparator for generating a first reset signal according to voltage comparison of a first reference voltage and the voltage across a secondary side transistor; a second comparator for generating a first set signal according to voltage comparison of a second reference voltage and the voltage across the secondary side transistor; a latch for generating a secondary side discharging end signal according to the first reset signal and the first set signal; a turn-off predictor for generating an off-predicting signal according to the cycle period of the secondary side discharging end signal to switch off the secondary side transistor; and a PWM controller for generating a PWM signal to control the primary side of the switching power conversion.

To make it easier for our examiner to understand the objective of the invention, its structure, innovative features, and performance, we use a preferred embodiment together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiment of the invention.

Figure 5:
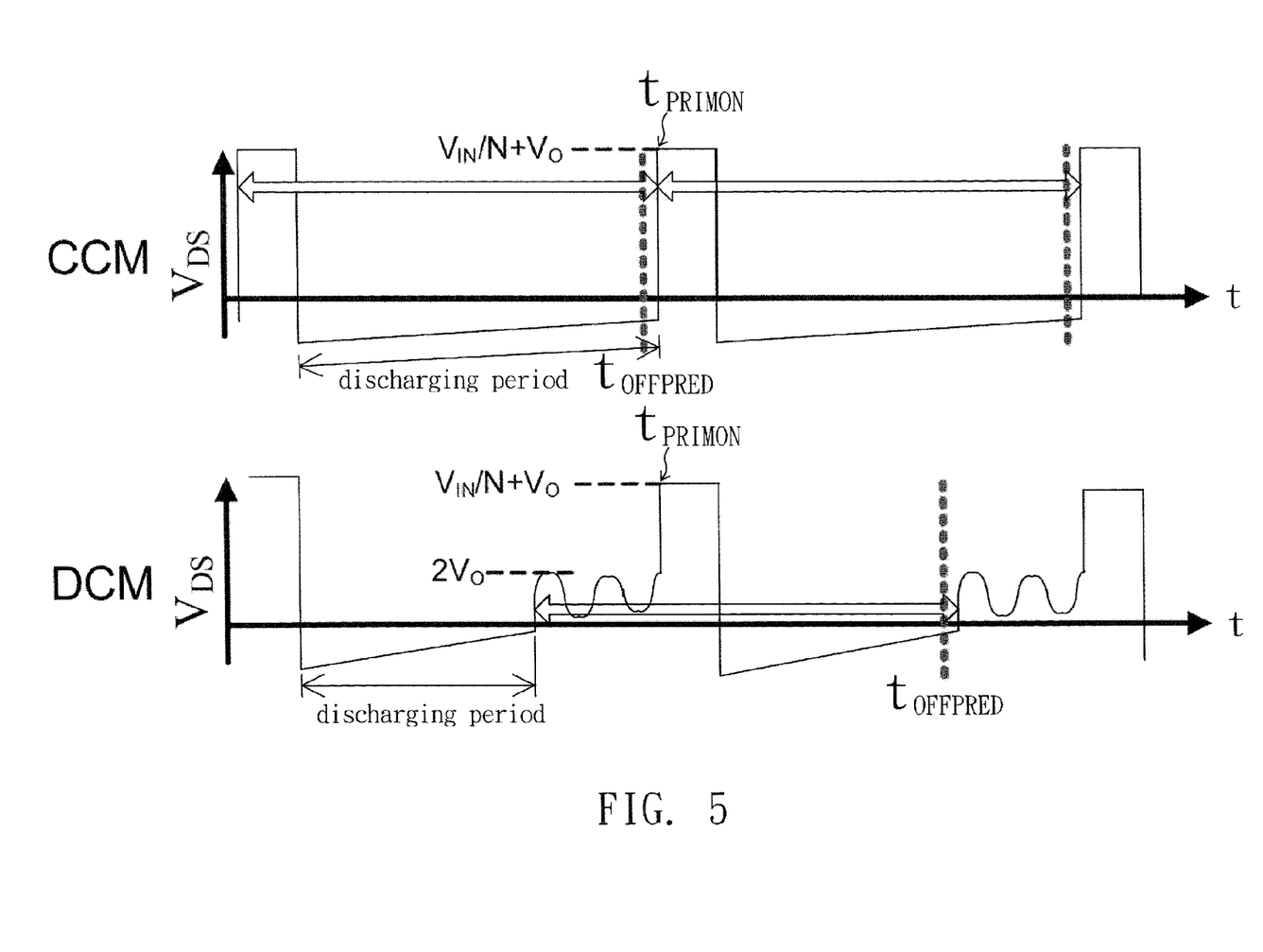
FIG. 5 is the waveform diagram in CCM and DCM for the voltage drop $V_{DS}$ of a transistor at the secondary side, illustrating the main concept of the present invention in switching off the secondary side transistor.

Please refer to FIG. 5, which shows the waveform diagram in CCM and DCM for the voltage drop $V_{DS}$ of a transistor at the secondary side, illustrating the main concept of the present invention in switching off the secondary side transistor. As shown in FIG. 5, the waveforms of the voltage drop $V_{DS}$ in DCM and CCM differ in that the waveform of $V_{DS}$ in DCM has a ring with a peak voltage of $2V_O$ during the discharging period. In view of this difference, the present invention sets a threshold voltage between 0 and $2V_O$ during the discharging period to detect the instance of discharging end. The present invention measures the discharging end cycle period from the instances of discharging end, and generates an off-predicting signal according to the instance of the discharging end and the discharging end cycle period to cut off the secondary side transistor. The scheme of the present invention can work both in CCM and DCM since the threshold voltage set between 0 and $2V_O$ during the discharging period can capture the instance of discharge end no matter the power conversion is in CCM or DCM. Besides, the value of $2V_O$ is large enough so that it is easy to implement the associated detection circuit, and the detection result is more insensitive to noise.

Figure 6:
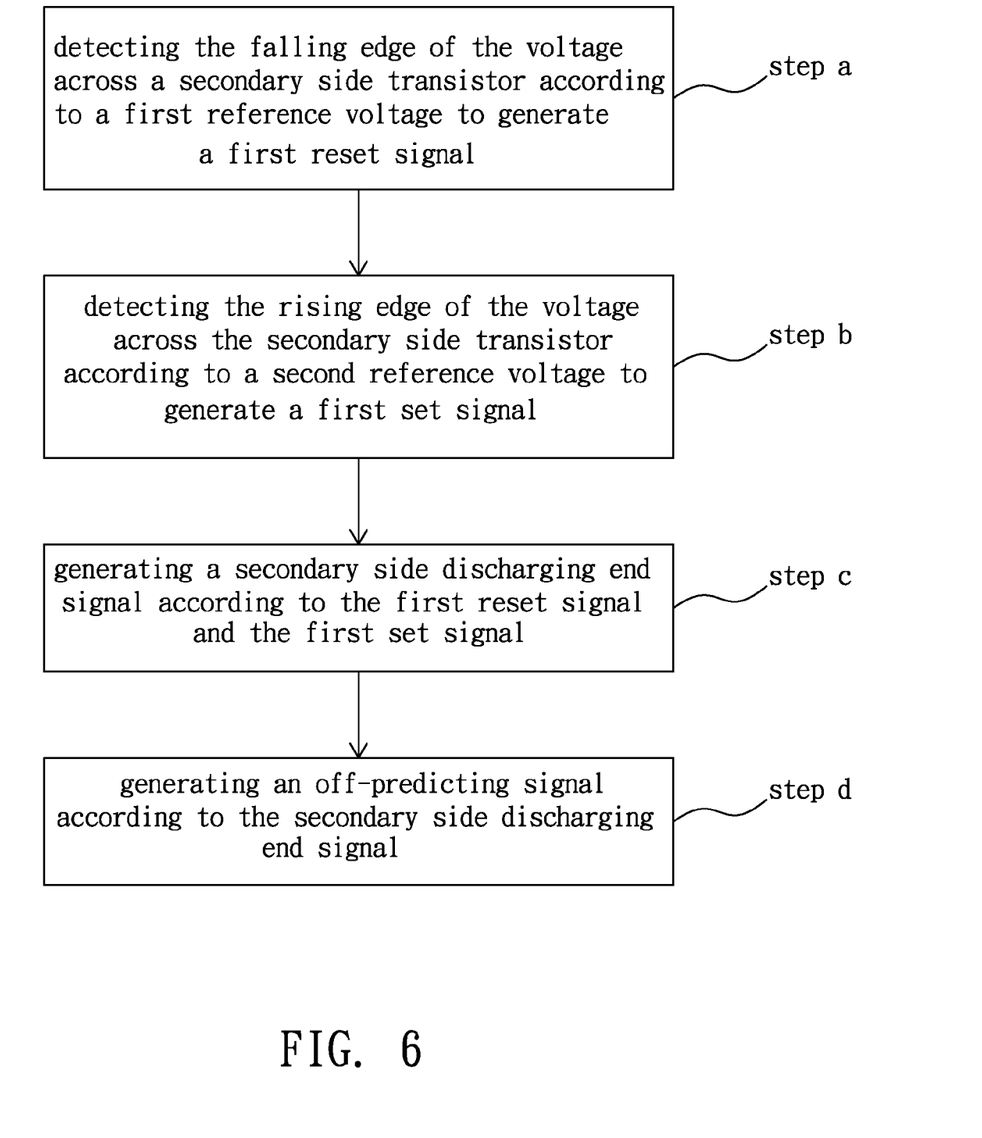
FIG. 6 is the flow chart of switching off the secondary side transistor according to a preferred embodiment of the present invention.

Please refer to FIG. 6, which shows the flow chart of switching off the secondary side transistor according to a preferred embodiment of the present invention. As shown in FIG. 6, the method includes the steps of: detecting the falling edge of the voltage across a secondary side transistor according to a first reference voltage to generate a first reset signal (step a); detecting the rising edge of the voltage across the secondary side transistor according to a second reference voltage to generate a first set signal (step b); generating a secondary side discharging end signal according to the first reset signal and the first set signal (step c); and generating an off-predicting signal according to the secondary side discharging end signal (step d).

In step a, the first reference voltage can be set between 0 v and −0.7 v, and the falling edge of the voltage across the secondary side transistor represents the start of a discharging period.

In step b, the second reference voltage can be set between 0 v and $2V_O$, and the rising edge of the voltage across the secondary side transistor represents the end of the discharging period.

In step c, the secondary side discharging end signal is a pulse signal of which the transitions of rising edge or falling edge are caused by the first reset signal and the first set signal, and the transitions can be used to represent the instances of the end of the discharging period.

In step d, the off-predicting signal is a pulse signal determined according to both the secondary side discharging end signal and a ratio of the cycle period of the secondary side discharging end signal, in order to switch off the secondary side transistor. The instances of the pulses in the off-predicting signal are then appropriately determined a short time before the turn-on of the primary side to prevent system disaster.

Figure 7:
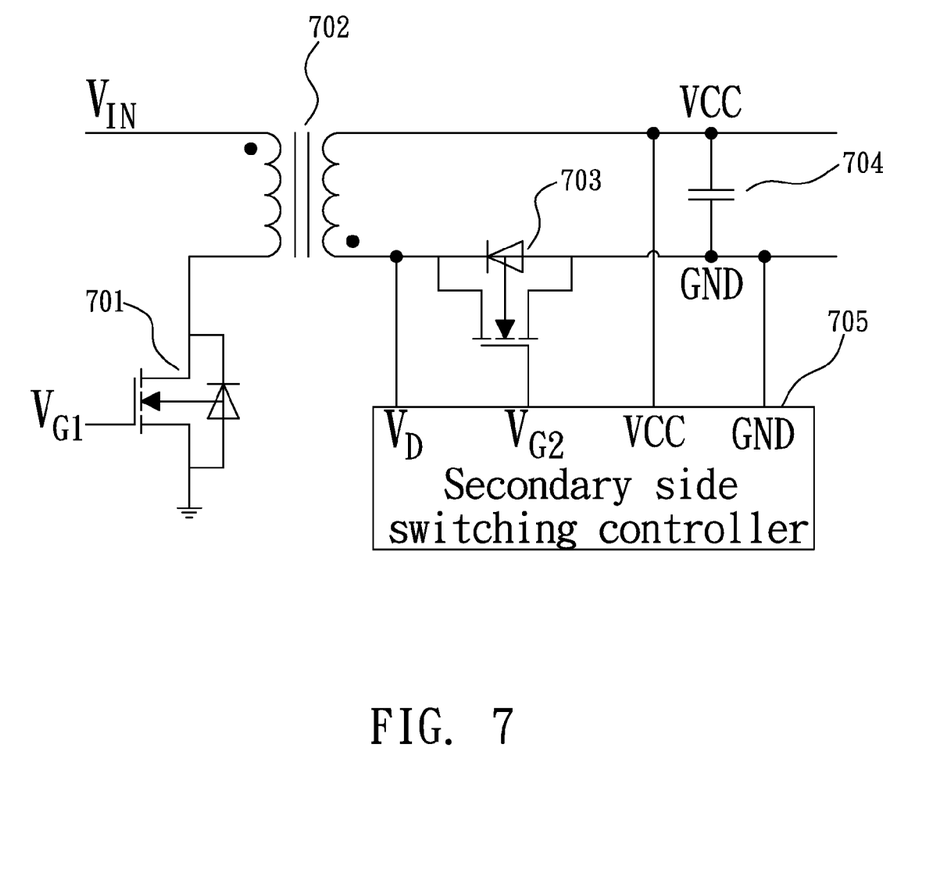
FIG. 7 is the block diagram according to a preferred embodiment of the present invention for switching a secondary transistor.

Please refer to FIG. 7, which shows the block diagram according to a preferred embodiment of the present invention for switching a secondary transistor. As shown in FIG. 7, the preferred embodiment of the present invention at least includes an NMOS transistor 701, a main transformer 702, an NMOS transistor 703, a capacitor 704 and a secondary side switching controller 705.

In the architecture, the NMOS transistor 701 is used to control the power transformation through the main transformer 702 in response to a PWM signal $V_{G1}$.

The main transformer 702 is used to transfer the input DC power $V_{IN}$ to a DC output voltage $V_{CC}$.

The NMOS transistor 703 is coupled with the secondary side of the main transformer 702 for cutting off the current path at the secondary side when the NMOS transistor 701 is on and releasing the magnetic flux to the capacitor 704 when the NMOS transistor 701 is off, under the control of a gating signal $V_{G2}$ from the secondary side switching controller 705.

The capacitor 704 is used for carrying the DC output voltage $V_{CC}$. Through a periodic on-and-off switching of the NMOS transistor 701, which is driven by the PWM signal $V_{G1}$ generated from a PWM controller (not shown in the figure), the input power is transformed through the main transformer 702 to the output.

The secondary side switching controller 705 is used to generate the gating signal $V_{G2}$ according to the drain voltage $V_D$ of the NMOS transistor 703. The associated operation includes: detecting the falling edge of the drain voltage $V_D$ according to a first reference voltage to generate a first reset signal (step a); detecting the rising edge of the drain voltage $V_D$ according to a second reference voltage to generate a first set signal (step b); generating a secondary side discharging end signal according to the first reset signal and the first set signal, wherein the secondary side discharging end signal is a pulse signal of which the transitions of rising edge or falling edge are caused by the first reset signal and the first set signal, and the transitions can be used to represent the instances of the end of the discharging period (step c); and generating an off-predicting signal according to the secondary side discharging end signal, wherein the off-predicting signal is a pulse signal determined according to both the secondary side discharging end signal and a ratio of the cycle period of the secondary side discharging end signal, in order to switch off the secondary side transistor, and the instances of the pulses in the off-predicting signal are appropriately determined a short time before the turn-on of the primary side to prevent system disaster (step d).

Figure 8:
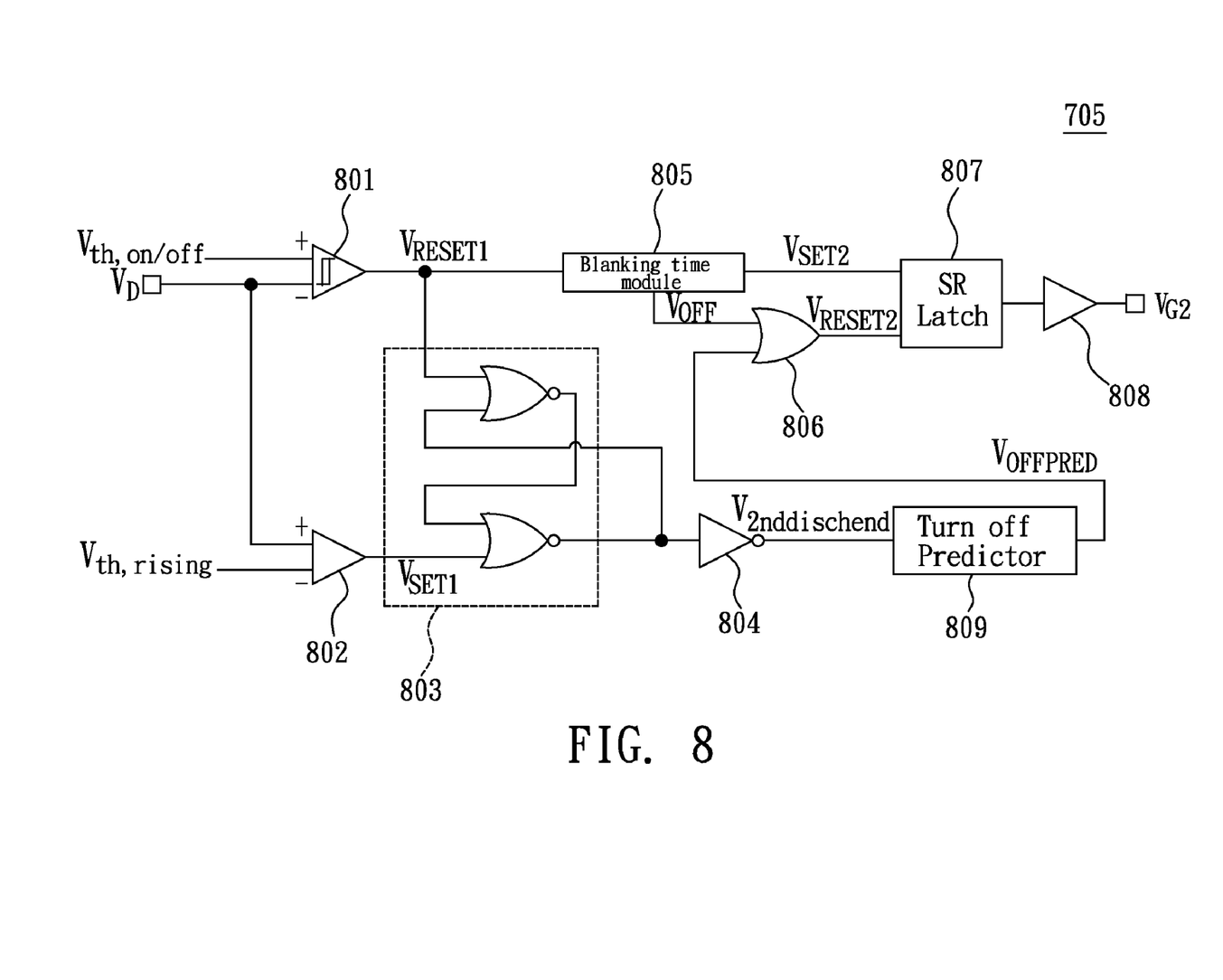
FIG. 8 is a detailed block diagram of the secondary side switching controller in FIG. 7.

FIG. 8 shows a detailed block diagram of the secondary side switching controller 705 in FIG. 7. As shown in FIG. 8, the secondary side switching controller 705 comprises a comparator 801, a comparator 802, a latch 803, a NOT gate 804, a blanking time module 805, an OR gate 806, an SR latch 807, a buffer 808, and a turn-off predictor 809.

The comparator 801 is used to generate a first reset signal $V_{RESET1}$ according to the drain voltage $V_D$ and a first reference voltage $V_{th,on/off}$, and the comparator 802 is used to generate a first set signal $V_{SET1}$ according to the drain voltage $V_D$ and a second reference voltage $V_{th,rising}$, wherein $V_{th,rising}$ is greater than $V_{th,on/off}$.

The latch 803 and the NOT gate 804 are used to generate a secondary side discharging end signal $V_{2nddischend}$ according to the first reset signal $V_{RESET1}$ and the first set signal $V_{SET1}$, wherein the secondary side discharging end signal $V_{2nddischend}$ is a pulse signal of which the transitions of rising edge or falling edge are caused by the first reset signal $V_{RESET1}$ and the first set signal $V_{SET1}$, and the transitions can be used to represent the instances of the end of the discharging period.

The blanking time module 805 is used to generate a second set signal $V_{SET2}$ and a turn-off signal $V_{OFF}$ according to the first reset signal $V_{RESET1}$, wherein the second set signal $V_{SET2}$ is used to turn on the secondary side transistor 703, and the turn-off signal $V_{OFF}$ is used to force the secondary side transistor 703 to be turned off.

The OR gate 806 is used to generate a second reset signal $V_{RESET2}$ according to the turn-off signal $V_{OFF}$ and an off-predicting signal $V_{OFFPRED}$.

The SR latch 807 and the buffer 808 are used to generate the gating signal $V_{G2}$ according to $V_{SET2}$ and $V_{RESET2}$, wherein $V_{SET2}$ is responsible for the on state of $V_{G2}$ to turn on the secondary side transistor 703, and $V_{RESET2}$ is responsible for the off state of $V_{G2}$ to turn off the secondary side transistor 703.

The turn-off predictor 809 is used to generate the off-predicting signal $V_{OFFPRED}$ according to the secondary side discharging end signal $V_{2nddischend}$, wherein the off-predicting signal $V_{OFFPRED}$ is a pulse signal determined according to both the secondary side discharging end signal $V_{2nddischend}$ and a ratio of the cycle period of the secondary side discharging end signal $V_{2nddischend}$, in order to switch off the secondary side transistor 703.

Figure 9:
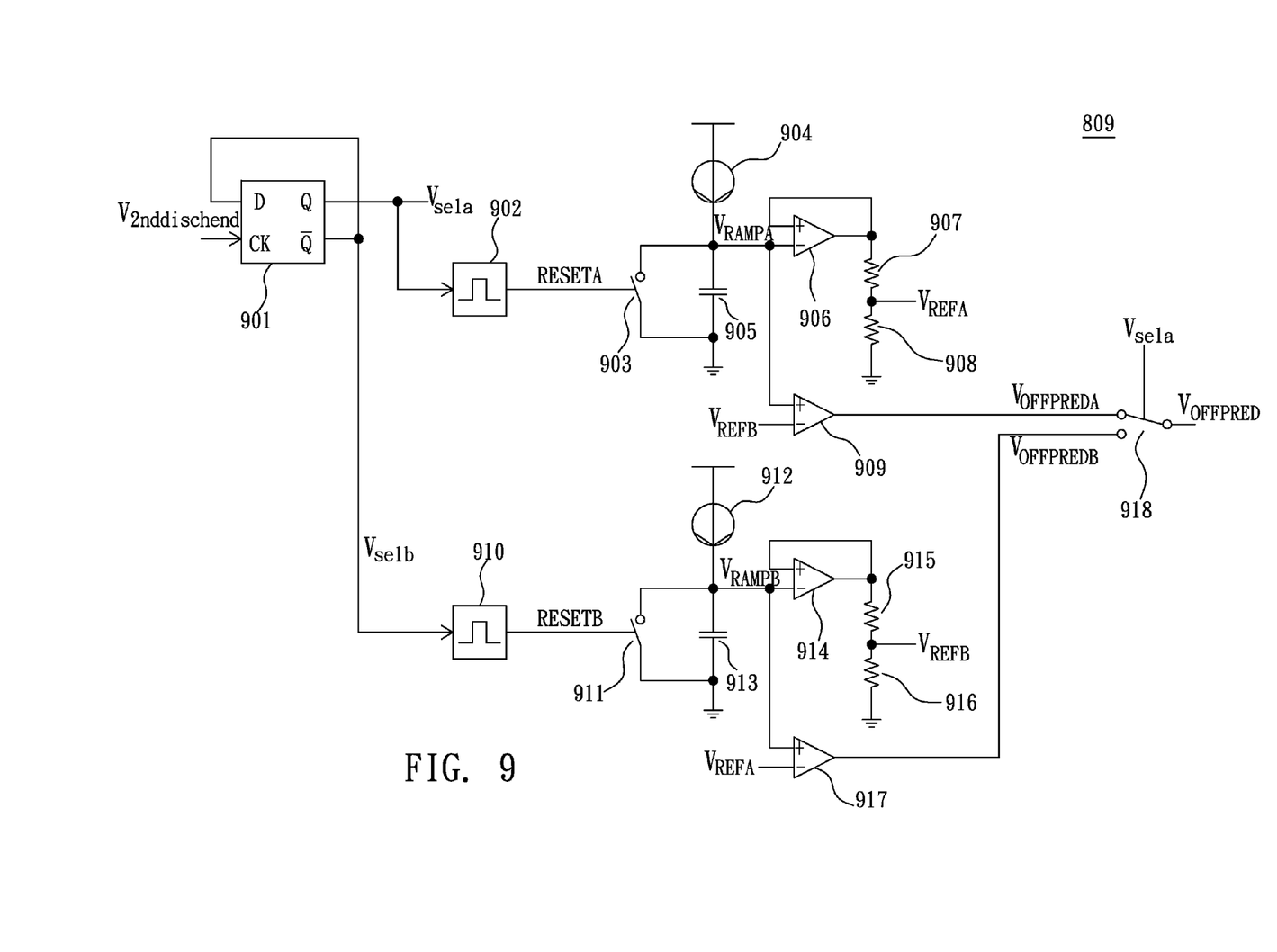
FIG. 9 is a detailed block diagram of the turn-off predictor in FIG. 8.

FIG. 9 shows a detailed block diagram of the turn-off predictor 809 in FIG. 8. As shown in FIG. 9, the turn-off predictor 809 includes a D-type flip-flop 901, a one-shot generator 902, a switch 903, a current source 904, a capacitor 905, an operational amplifier 906, a resistor 907, a resistor 908, a comparator 909, a one-shot generator 910, a switch 911, a current source 912, a capacitor 913, an operational amplifier 914, a resistor 915, a resistor 916, a comparator 917, and a switch unit 918.

The D-type flip-flop 901 is used to generate a first select signal $V_{sela}$ and a second select signal $V_{selb}$ according to the $V_{2nddischend}$. The D-type flip-flop 901 basically acts as a frequency divider so that the pulses of $V_{sela}$ will interleave the pulses of $V_{selb}$.

The one-shot generator 902 is used to generate a first discharging pulse RESETA according to $V_{sela}$.

The switch 903 is used to discharge the capacitor 905 in response to RESETA.

The current source 904 and the capacitor 905 are used to generate a ramp signal $V_{RAMPA}$.

The operational amplifier 906, the resistor 907, and the resistor 908 are used to generate a division voltage $V_{REFA}$ of the first ramp signal $V_{RAMPA}$.

The comparator 909 is used to generate a first off-predicting signal $V_{OFFPREDICTA}$ according to the $V_{RAMPA}$ and a division voltage $V_{REFB}$.

The one-shot generator 910 is used to generate a first discharging pulse RESETB according to $V_{selb}$.

The switch 911 is used to discharge the capacitor 913 in response to RESETB.

The current source 912 and the capacitor 913 are used to generate a ramp signal $V_{RAMPB}$.

The operational amplifier 914, the resistor 915, and the resistor 916 are used to generate a division voltage $V_{REFB}$ of the first ramp signal $V_{RAMPB}$.

The comparator 917 is used to generate a first off-predicting signal $V_{OFFPREDICTB}$ according to the $V_{RAMPB}$ and the $V_{REFA}$.

The switch unit 918 is used to interleave $V_{OFFPREDICTA}$ with $V_{OFFPREDICTB}$ to generate $V_{OFFPRED}$ under the control of $V_{sela}$.

Figure 10:
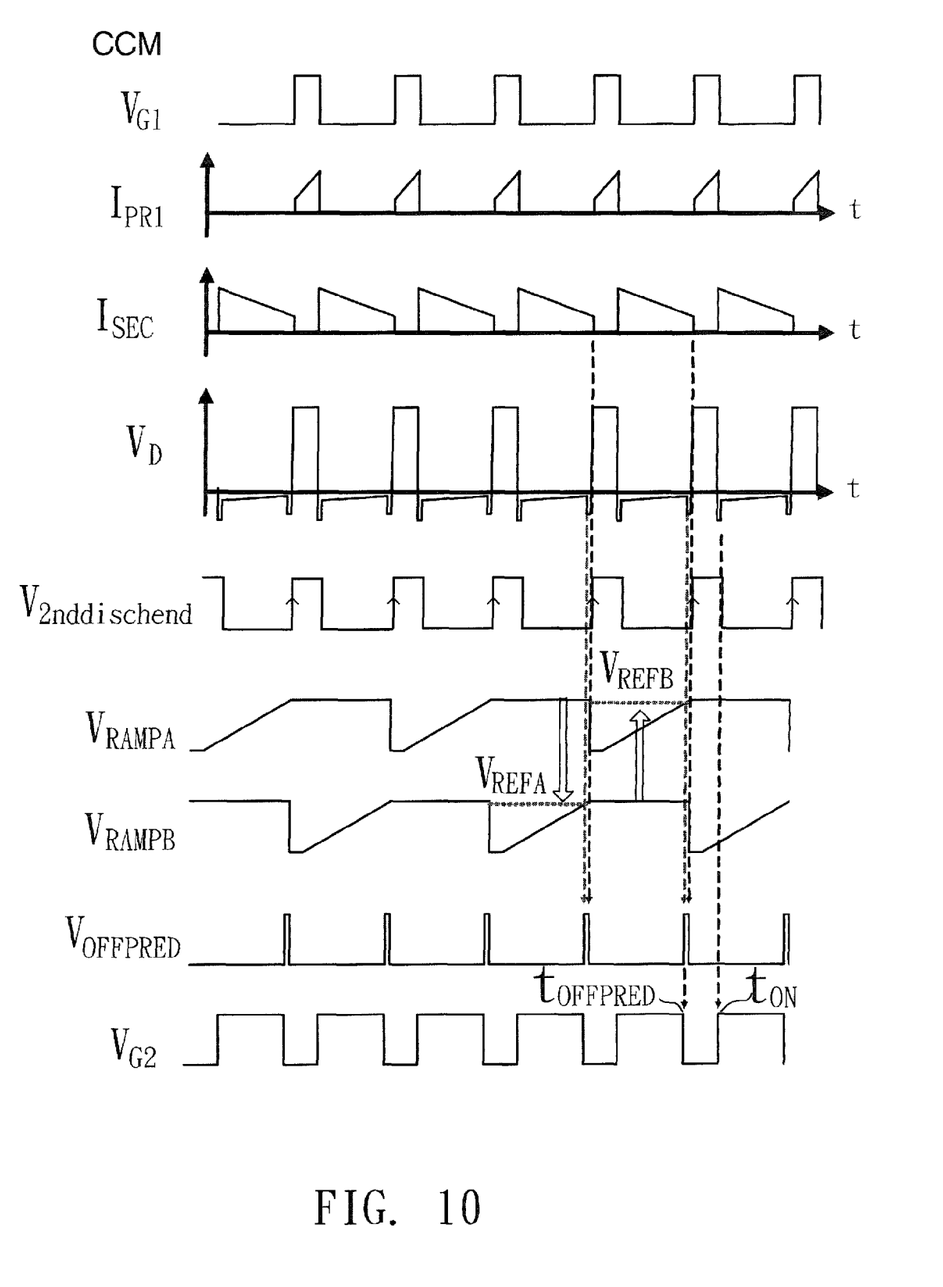
FIG. 10 is the waveform diagram in CCM for FIG. 8 and FIG. 9.
Figure 11:
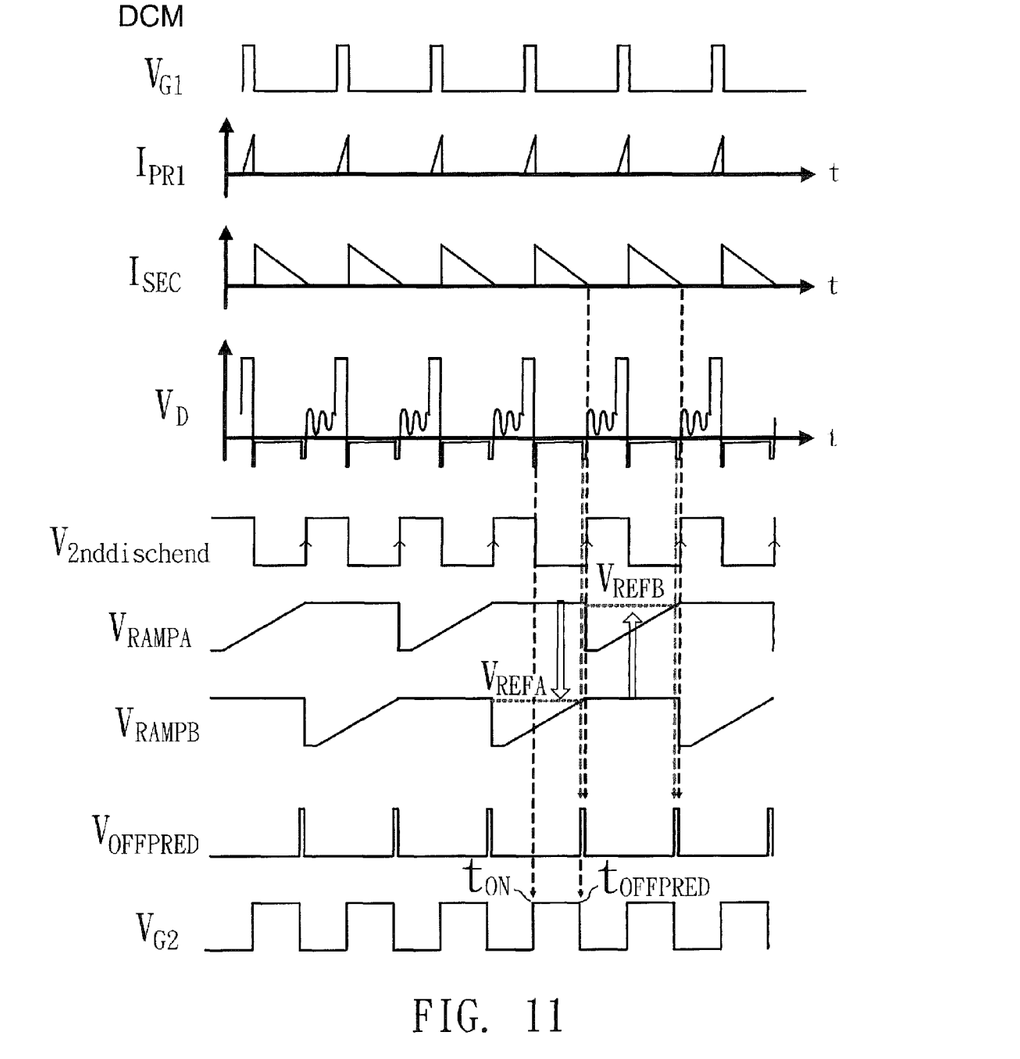
FIG. 11 is the waveform diagram in DCM for FIG. 8 and FIG. 9.

The operation waveform in CCM of FIG. 7, FIG. 8 and FIG. 9 is shown in FIG. 10, and the operation waveform in DCM of FIG. 7, FIG. 8 and FIG. 9 is shown in FIG. 11. As shown in FIG. 10 and FIG. 11, each pulse of $V_{OFFPRED}$ appears a short time before the rising edge of $V_{2nddischend}$, and $V_{RAMPA}$ interleaves with $V_{RAMPB}$ to generate the $V_{OFFPRED}$.

Using the secondary side switch-off timing adjusting apparatus of a preferred embodiment of the present invention as illustrated in FIG. 8 and FIG. 9 to implement the secondary side switching controller 705 in FIG. 7, an AC-to-DC power adapter capable of adjusting secondary side switch-off timing is proposed. Besides, the present invention can be applied to the switching power conversion of AC to AC, DC to AC, or DC to DC.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A secondary side switch-off timing adjusting method for a switching power conversion, comprising the steps of:
   detecting the falling edge of the voltage across a secondary side transistor according to a first reference voltage to generate a first reset signal;
   detecting the rising edge of the voltage across said secondary side transistor according to a second reference voltage to generate a first set signal;
   generating a secondary side discharging end signal from a first latch operation in response to said first reset signal and said first set signal;
   generating an off-predicting signal according to the cycle period of said secondary side discharging end signal;
   generating a second set signal and a turn-off signal from a blanking operation on said first reset signal;
   generating a second reset signal from a logic-or operation on said off-predicting signal and said turn-off signal; and
   generating a gating signal for driving said secondary side transistor from a second latch operation in response to said second reset signal and said second set signal.

2. The method according to claim 1, wherein said second reference voltage is greater than said first reference voltage.

3. The method according to claim 1, wherein said first latch operation is SR latch operation and said second latch operation is SR latch operation.

4. A secondary side switch-off timing adjusting apparatus for a switching power conversion, comprising:
   a first comparator for generating a first reset signal according to voltage comparison of a first reference voltage and the voltage across a secondary side transistor;
   a second comparator for generating a first set signal according to voltage comparison of a second reference voltage and the voltage across said secondary side transistor;
   a first latch for generating a secondary side discharging end signal according to said first reset signal and said first set signal;
   a turn-off predictor for generating an off-predicting signal according to the cycle period of said secondary side discharging end signal;
   a blanking time module for generating a second set signal and a turn-off signal from a blanking operation on said first reset signal;
   a logic-or gate for generating a second reset signal from a logic-or operation on said off-predicting signal and said turn-off signal; and
   a second latch for generating a gating signal for driving said secondary side transistor in response to said second reset signal and said second set signal.

5. The apparatus according to claim 4, wherein said second reference voltage is greater than said first reference voltage.

6. The apparatus according to claim 4, wherein said turn-off predictor comprises:
   a toggling unit for generating a first selecting signal and a second selecting signal according to the level transitions of said secondary side discharging end signal;
   a first predicting unit for generating a first ramp signal and a first off-predicting pulse in response to said first selecting signal;
   a second predicting unit for generating a second ramp signal and a second off-predicting pulse in response to said second selecting signal; and
   a switch unit for generating said off-predicting signal by outputting said first off-predicting pulse and said second off-predicting pulse in an alternating manner, under the control of said first selecting signal, wherein said first off-predicting pulse is generated according to voltage comparison of said first ramp signal and a division voltage of said second ramp signal, and wherein said second off-predicting pulse is generated according to voltage comparison of said second ramp signal and a division voltage of said first ramp signal.

7. The apparatus according to claim 6, wherein said first predicting unit comprises:
   a first one-shot pulse generator for generating a first discharging pulse according to said first selecting signal;
   a first switch for pulling said first ramp signal to ground in response to said first discharging pulse;
   a first capacitor for carrying said first ramp signal;
   a first current source for charging said first capacitor to generate said first ramp signal; and
   a first output comparator for generating said first off-predicting pulse according to said first ramp signal and said division voltage of said second ramp signal.

8. The apparatus according to claim 6, wherein said second predicting unit comprises:
   a second one-shot pulse generator for generating a second discharging pulse according to said second selecting signal;
   a second switch for pulling said second ramp signal to ground in response to said second discharging pulse;
   a second capacitor for carrying said second ramp signal;

a second current source for charging said second capacitor to generate said second ramp signal; and a second output comparator for generating said second off-predicting pulse according to said second ramp signal and said division voltage of said first ramp signal.

9. A system using a secondary side switch-off timing adjusting apparatus for a switching power conversion, comprising:

a first comparator for generating a first reset signal according to voltage comparison of a first reference voltage and the voltage across a secondary side transistor;

a second comparator for generating a first set signal according to voltage comparison of a second reference voltage and the voltage across said secondary side transistor;

a latch for generating a secondary side discharging end signal according to said first reset signal and said first set signal;

a turn-off predictor for generating an off-predicting signal according to the period of said secondary side discharging end signal to switch off said secondary side transistor;

a blanking time module for generating a second set signal and a turn-off signal from a blanking operation on said first reset signal;

a logic-or gate for generating a second reset signal from a logic-or operation on said off-predicting signal and said turn-off signal;

a second latch for generating a gating signal for driving said secondary side transistor in response to said second reset signal and said second set signal; and a PWM controller for generating a PWM signal to control said switching power conversion.

10. The system according to claim 9, wherein said switching power conversion is one selected from the group consisting of AC to DC, AC to AC, DC to AC, and DC to DC.

* * * * *